United States Patent [19]
Rendall et al.

[11] Patent Number: 6,056,813
[45] Date of Patent: *May 2, 2000

[54] PROCESS AND SYSTEM FOR PRODUCING PIGMENTS DIRECTLY FROM COMPONENT RAW MATERIALS WITHOUT BYPRODUCTS

[75] Inventors: John S. Rendall; Massoud Ahghar; Jerry V. Fox; Fred A. Aiken, III, all of Albuquerque, N. Mex.

[73] Assignee: Solv-Ex Corporation, Albuquerque, N. Mex.

[ * ] Notice: This patent is subject to a terminal disclaimer.

[21] Appl. No.: 09/211,693

[22] Filed: Dec. 14, 1998

[51] Int. Cl.$^7$ .............................. C09C 1/40; C09D 17/00
[52] U.S. Cl. .......................... 106/400; 423/184; 423/199
[58] Field of Search ........................... 106/400; 423/184, 423/199

[56] References Cited

U.S. PATENT DOCUMENTS 5,895,523   4/1999   Rendall et al. .......................... 106/400

*Primary Examiner*—Mark L. Bell
*Assistant Examiner*—Michael J. Di Verdi
*Attorney, Agent, or Firm*—Thomas E. Schatzel; Law Offices of Thomas E. Schatzel A Prof. Corp.

[57] ABSTRACT

A process for making white pigment directly from constituent materials without byproducts. The process comprises the steps of inputting three material flows comprising a sulphate source, an alkali source, and an aluminum source. And, recycling and mixing into the three material flows a process return from a separation and wash stage and vapors from a pressure let-down stage. This is followed by heating and holding a mixture of recycled process returns and the three material flows at elevated pressure in a reactor for a minimum predetermined residence time. Afterwards, letting down pressure in a flow from the reactor to produce a pre-wash flow. Then, separating, classifying, and delaminating the pre-wash flow into a first and second pigment or filler that are differentiated by their respective average particle distribution sizes.

7 Claims, 4 Drawing Sheets

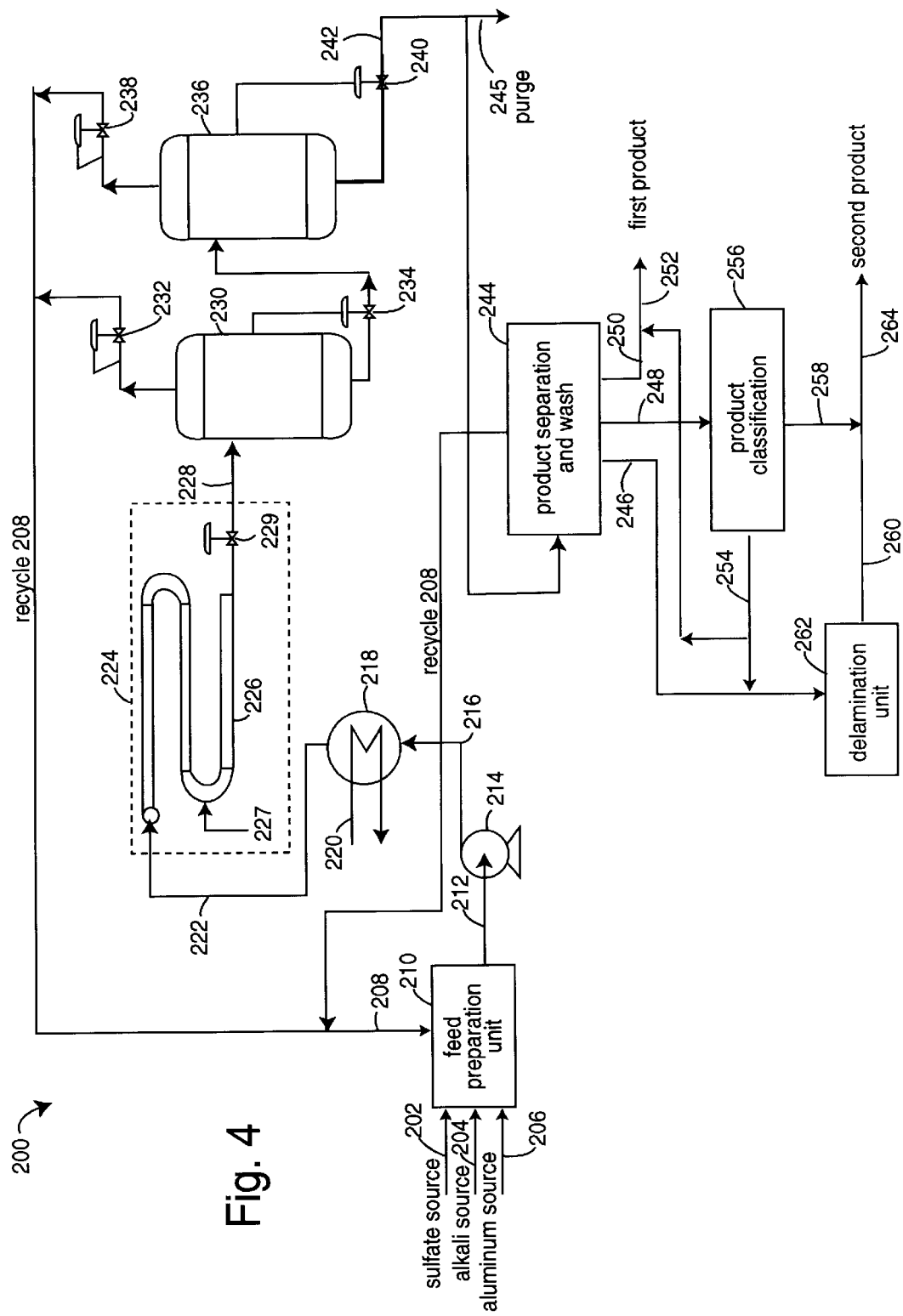

PROCESS AND SYSTEM FOR PRODUCING PIGMENTS DIRECTLY FROM COMPONENT RAW MATERIALS WITHOUT BYPRODUCTS

BACKGROUND OF THE INVENTION

1. Field of the Invention

The invention relates generally to the production of ink and paper pigments and fillers and more specifically to the production of under four-micron sized particles of basic potassium or sodium aluminum sulphate to substitute for relatively more expensive pigments including titanium dioxide.

2. Description of the Prior Art

Titanium dioxide is principally used as a pigment to provide brightness, whiteness and opacity for paints and coatings, plastics, paper, inks, fibers, food and cosmetics. Titanium dioxide is by far the most widely used white pigment in the world, having a refractive index second only to diamonds. A high refractive index translates to high opacity. Although magnesium oxide is whiter than titanium dioxide, its refractive index is much lower than that for titanium dioxide. Relatively more magnesium oxide would be needed in a paint to obtain the same opacity, therefore for practical purposes, titanium dioxide is preferred.

Nature does not provide titanium dioxide in a form that is directly usable. Nature usually associates titanium dioxide with iron, either as ilmenite or leuxocene ores. Titanium dioxide is mined in one of its purest forms, rutile beach sand. The most important deposits in the world include rutile beach sand and ilmenite soaps, and these ores are the principle raw materials used in the prior art manufacture of titanium dioxide pigment.

Reportedly, in 1995, the titanium dioxide pigment market, was valued at about $2.6 billion; was supplied primarily by five producer companies at eleven manufacturing plants in nine American states; about forty-seven percent of titanium dioxide production was used in paint, varnishes, and lacquers; about twenty-four percent was used in paper; about eighteen percent was used in plastics; and about eleven percent went into miscellaneous uses such as catalysts, ceramics, coated fabrics and textiles, floor coverings, printing ink, roofing granules, etc.

The conventional production of titanium dioxide pigments involves a two step process. The first step is to purify the ore, and is basically a refinement step. This may be achieved by either the sulfate process, which uses sulfuric acid as a liberating agent, or the chloride process, which uses chlorine as the liberating agent. Once refined, and developed to the appropriate particle size, the pigment may be surface treated with inorganic oxides or an organic material to give each grade its unique characteristics.

The sulfate process for producing titanium dioxide pigments is often referred to as the older process, relative to the more modern chloride process. The sulfate process is used to produce high quality titanium dioxide pigment grades for the ink, fibers and paper industries. Kronos, Inc. (Houston, Tex.), for example, was granted patents for the sulfate process and has been producing titanium dioxide pigment using this process continuously since 1916. Since the late 1970's, Kronos has also manufactured grades using the chloride process. The chloride process was developed by the Kronos research and development group in Leverkusen, Germany, and commissioned its first chloride plant in the late 1970's.

A high purity rutile titanium dioxide is used in electroceramics for its dielectric properties, in vitreous enamels for its ease of fusion, in glasses to modify the refractive index and to improve the thermal and mechanical properties, in containers to absorb ultraviolet light for food preservation, in ceramics to enhance sintering and improve the thermal and chemical resistance, and in arc welding to ensure excellent ionization and easy re-ignition of the electrode to prevent electrode sputtering and control slag fluidity.

The rutile titanium dioxide grade is typically produced via the sulfate process, with low abrasion and high gloss. High brightness and very good opacity allows for this to be an ideal pigment for ink formulations, particularly rotogravure and polyamide flexo inks where it combines excellent dispersion, high gloss and opacity with very low abrasion.

Titanium dioxide pigments can be designed for ease of dispersion in many aqueous applications with minimal requirement for dispersing agents. Such pigment can be added at the beater or hydropulper to improve the opacity and brightness of the finished sheet. It can be used in the dry state as received, or can be slurried in water at the mill site to take advantage of slurry additions. It is also used to enhance opacity and brightness of paper coatings. It disperses readily in water at high solids without additional dispersing agent over that normally used in the coating mixture. The pigment can be used for white sidewall rubber goods that provide self-cleanup through chalking and resistance to ozone cracking. Its low abrasion properties promote its application in rubber thread compounds, both extruded and cut rubber thread. Cost effectiveness may be obtained in white plastic film, sheeting and profiles. Titanium dioxide pigment is used in traffic marking paints where an anatase grade is permitted. Field tests of traffic stripes indicate that the weathering of pigmented traffic stripes result in improved night visibility with minimal film loss. Titanium dioxide pigment may be used in white exterior aqueous and non-aqueous paints to impart controlled chalking.

Titanium dioxide pigment can be used in melamine laminate compositions where its resistance to ultraviolet light discoloration is outstanding. Titanium dioxide pigment can provide high brightness and very high resistance to ultraviolet discoloration in pigmented decorative papers for melamine formaldehyde laminates. KRONOS 2081 pigment is suitable for use in printing inks which are used in melamine-formaldehyde laminate systems. KRONOS 2081 pigment is suitable for pigmentation of melamine formaldehyde resins.

SUMMARY OF THE PRESENT INVENTION

An object of the present invention is to provide a method for the production of pigment fillers and coating materials for paper.

Another object of the present invention is to provide a pigment filler for use in the production of plastics, paints, and inks, and any other use requiring very small particle sizes (less than four microns), extreme whiteness, and brightness exceeding 90 on a scale of 1 to 100.

Briefly, a method embodiment of the present invention includes a process for making white pigment directly from constituent materials without byproducts. The process comprises the steps of inputting three material flows comprising a sulphate source, an alkali source, and an aluminum source. And, recycling and mixing into the three material flows a process return from a separation and wash stage and condensed vapors from a pressure let-down stage. This is followed by heating and holding a mixture of recycled process returns and the three material flows at elevated pressure in a reactor for a minimum predetermined residence time, followed by letting down pressure in a flow from the reactor to produce a pre-wash flow. Then, the separating, classifying, and delaminating the pre-wash flow into a first and second pigment or filler, that are differentiated by their respective average particle distribution sizes, are conducted.

An advantage of the present invention is that it provides a process for producing high quality white pigment.

Another advantage of the present invention is that it provides an inexpensive process for making pigments and fillers useful in paints, paper, inks, and plastics.

These and other objects and advantages of the present invention will no doubt become obvious to those of ordinary skill in the art after having read the following detailed description of the preferred embodiment that is illustrated in the drawing figures.

IN THE DRAWINGS

FIG. 4 is a schematic diagram of a pipe-reactor continuous process embodiment of the present invention for making pigments and fillers useful in paints, paper and plastics.

DETAILED DESCRIPTION OF THE PREFERRED EMBODIMENTS

Figure 1:
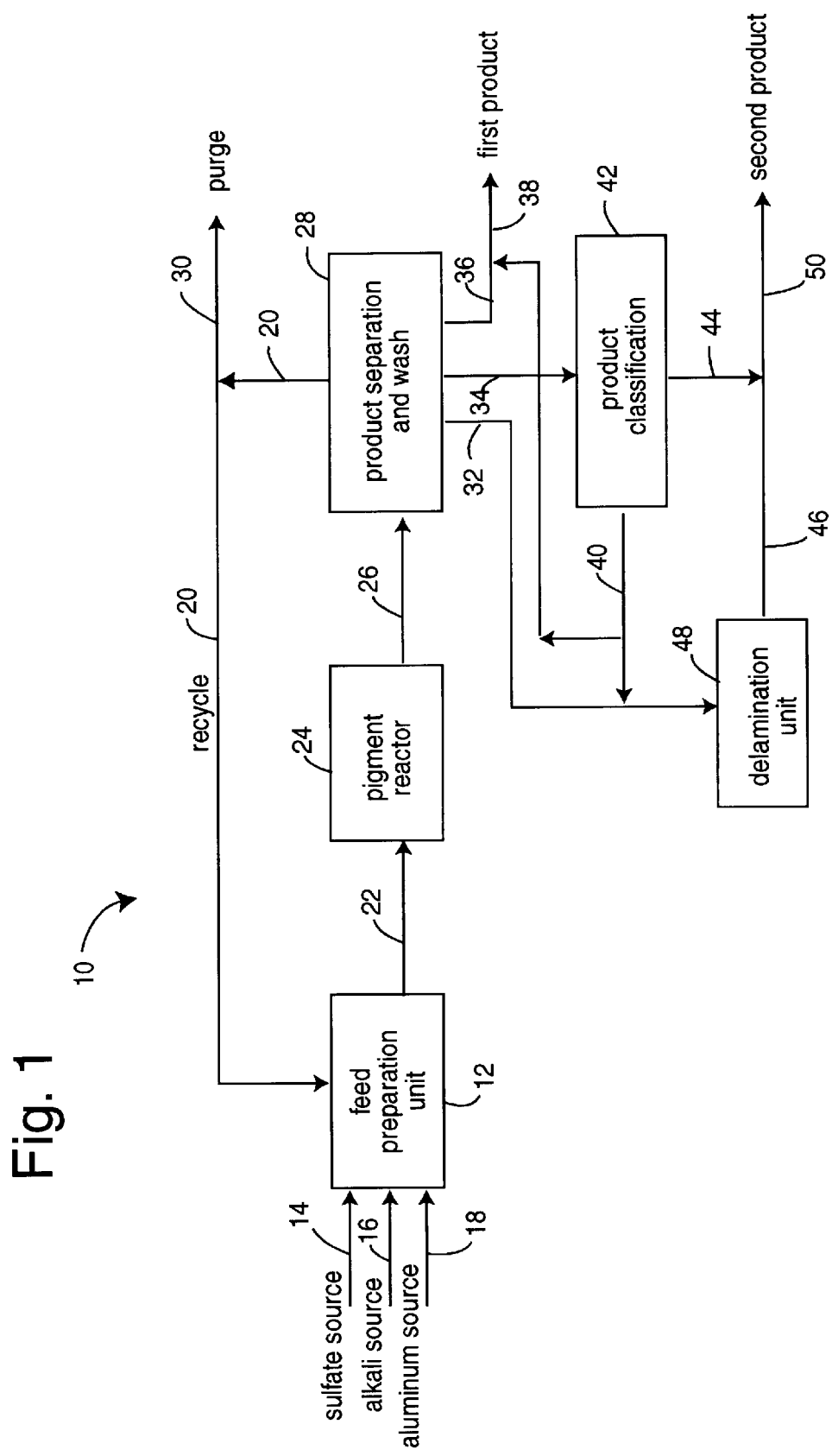
FIG. 1 is a process flow diagram of a batch process embodiment of the present invention for making pigments and fillers useful in paints, inks, paper, and plastics.
Figure 2A:
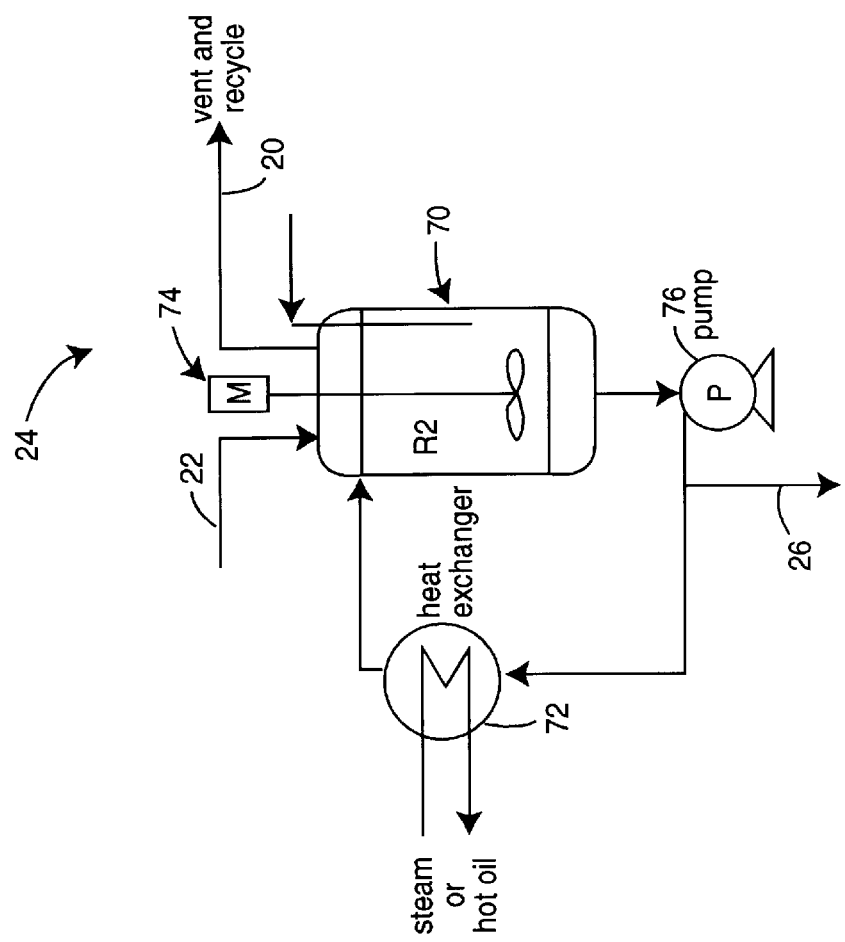
FIGS. 2A and 2B are schematic diagrams of two stirred reactor vessels used in the process of FIG. 1.

FIG. 1 illustrates a process embodiment of the present invention, and is referred to by the general reference numeral 10. The process 10 is a batch mode process with a feed preparation unit 12 with three source material inputs 14, 16 and 18. The input 14 is a sulfuric acid ($H_2SO_4$) stream. The input 16 is a sodium hydroxide (NaOH), i.e., "caustic", stream typically about fifty percent solution. These are mixed with the input 18 which is an aluminum hydroxide stream, and a recycle stream 20. A combined mixture is heated in a stirred-vessel reactor (R1) within the feed preparation unit 12 to a temperature in the approximate range of 110° C. and 140° C., preferably about 130° C. The stirred-vessel reactor (R1) is illustrated in FIG. 2A. A heated mixture stream 22 is then transferred to a pigment reactor 24, which is detailed more fully in FIG. 2B. A reaction mixture 26 flows to a product separation and wash unit 28 that separates the solid pigment product from a solution of unreacted components, e.g., by filtering. A filtrate is recycled in recycle flow 20 to feed preparation unit 12 to become part of a next production cycle. A small purge flow 30 is used to control a buildup of impurities that could otherwise occur. A product pigment can be washed either as a part of the filtration operation, or in a separate step. In general, the particular washing method chosen is not important, except whatever method is chosen preferably must use a minimum of clean water. Any spent wash water is recycled and joins the filtrate as part of recycle flow 20. A washed product is made into a slurry by adding water and it leaves the separation and wash unit 28 in three washed filter cake flows, 32, 34, and 36. Such flows typically have a wide particle size distribution that may embrace several product specification ranges of individual commercial-product materials. A first product output 38 is produced by adding a first classified output 40 with particle size distribution over one micron from a classifier 42. A second classified output 44 with particle size distribution under one micron is mixed with a delaminated flow 46 from a delaminator 48 to produce a second product output 50.

Any suitable mechanical device may be used to separate the two products based upon particle size distribution. In one such device a specially adapted and modified centrifugal classifier is used to separate the two products. For example, high centrifugal bowl units made by Bird Machine Company, Robatel, Hutchison Hayes, or Humbolt may be adapted for use, or a modified hydrocyclone or any other particle classifying device capable of separating particles into two or more size ranges. Classification is generally accomplished by centrifuging the output from the step of delaminating in a bowl-type centrifuge. There are preferably at least two bowl-centrifuge liquid taps at different radial points to bifurcate a pigment substitute material output into a first product with an average particle size under a micron in diameter, and at least one other product with an average particle distribution size of one to four microns.

The first product flow 38 is produced with a paper filler particle size distribution range, e.g., 0–7 microns, but preferably in the range of 1–4 microns. The pigment particle size distribution is reduced by the delaminator 48 and the moisture content is adjusted to suit customer requirements, e.g., such as for paper coatings with a particle size distribution of less than one micron.

Referring to FIG. 2A, one or more of the reactant flow inputs 14, 16, or 18 may be individually connected to a stirred-vessel reactor (R1) 60. At the temperatures mentioned, the pressure within the stirred-vessel reactor (R1) 60 typically rises to equal the vapor pressure of the solution within, approximately 30–40 PSIG. The temperature is preferably increased by pumping the input-material mixture through a heat exchanger 62 that can use either steam or hot oil input, depending on which is more economical. A plate-type exchanger is generally preferred, but any conventional heat exchanger can be used, provided it can tolerate the temperature, pressure, process chemistry, and suspended solids unique to this process. Alternatively, the input-material mixture in stirred-vessel reactor (R1) 60 may be heated directly by injecting steam into it. Further heating of the mixture may be accomplished by a combination of direct and indirect methods. A motorized mixer 64 is used to stir the contents and a pump 66 is used to circulate the contents through the heat exchanger 62. A purge flow 68 may be taken from stream 22 if necessary to remove impurities that may have been precipitated in the feed preparation unit 12.

Figure 2B:
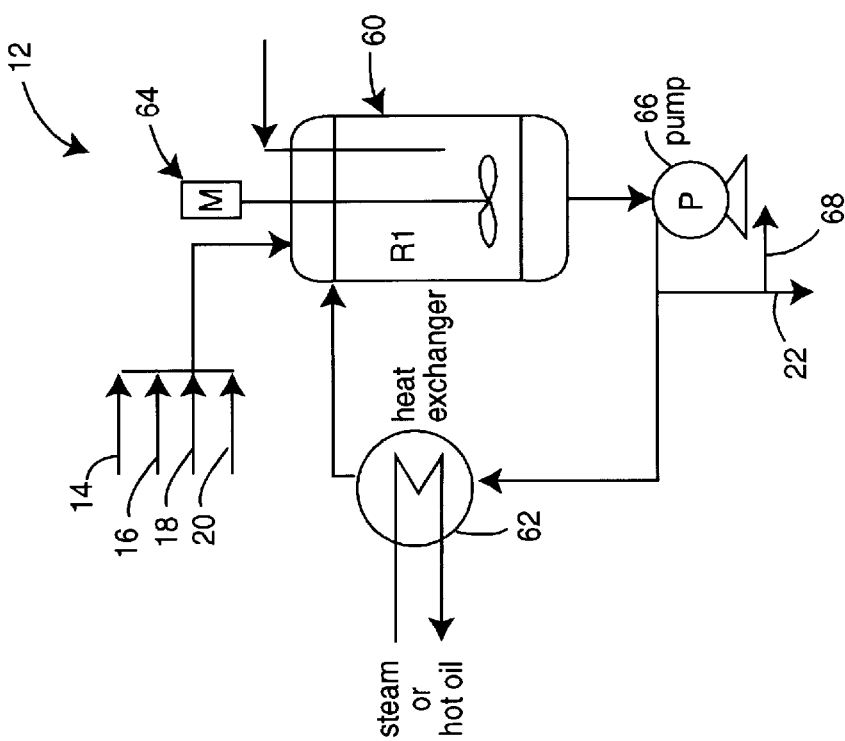

Referring now to FIG. 2B, the pigment reactor 24 is also preferably a stirred-vessel reactor (R2) 70, and is heated by a heat exchanger 72. The heating of the mixture is such that the temperature is raised to between 170° C. and 220° C., and preferably about 200° C. Any type heat exchanger is acceptable provided it can tolerate the temperature, pressure, process chemistry, and suspended solids. A motorized mixer 74 is used to stir the contents and a pump 76 is used to circulate the contents through the heat exchanger 72. The mixture is temperature controlled for a "residence time", that can span between several seconds and several minutes, depending upon the desired characteristics of the reaction product. For example, by speed control of pump 76 or by using a flow control valve on the pump discharge. After completing a predetermined reaction time, the pressure in stirred-vessel reactor (R2) 70 is reduced to 0–30 PSIG by venting through line 20. The vented vapors are cooled, condensed, and added to the plant recycle material. The reaction mixture is then transferred to the product separation and wash unit 28.

A product pigment composed of a double salt of the type $wK_2SO_4 \cdot xAl_2O_3 \cdot ySO_3 \cdot zH_2O$ or $vNa_2SO_4 \cdot xAl_2O_3 \cdot ySO_3 \cdot zH_2O$, is formed by the present invention. Where, "v" is the stoichiometric coefficient of $Na_2SO_4$ (generally in the range of zero to one); "w" is the stoichiometric coefficient of $K_2SO_4$ (generally in the range of zero to one); "x" is the stoichiometric coefficient of $Al_2O_3$ (generally about three); "y" is the stoichiometric coefficient of $SO_3$ (generally about four); and, "z" is the stoichiometric coefficient of $H_2O$ (generally about nine). Using both of the alkali metals, K and Na, as the raw materials produces a combination represented by the above-described double salts. Also, a pigment product may be produced without the alkali component (i.e., stoichiometric coefficients "v" and "w" are zero). In this case the feed preparation section would be modified accordingly.

Figure 3:
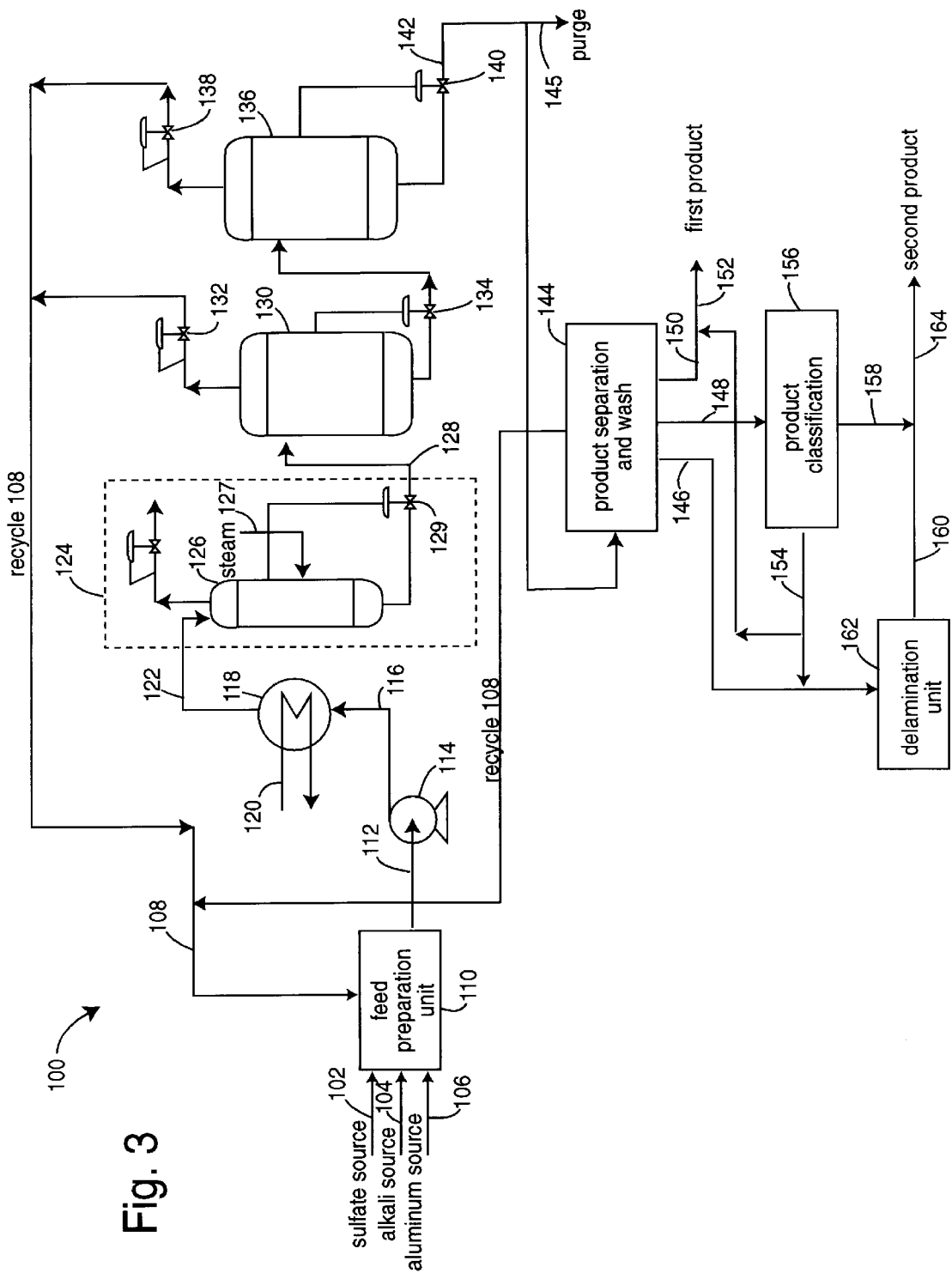
FIG. 3 is a schematic diagram of a vessel-reactor continuous process embodiment of the present invention for making pigments and fillers useful in paints, paper and plastics.

FIGS. 3 and 4 illustrate continuous-mode process embodiments of the present invention, which are alternative to the batch-mode process 10. In general, the major process parts are about the same as in the batch mode process 10. In a vessel-reactor type continuous-mode process 100, as shown in FIG. 3, a set of three raw materials flows 102, 104, and 106, and a process recycle flow 108 are fed into a feed preparation unit 110. Such material inputs are mixed and raised in temperature to a range of approximately 15° C.–130° C. and preferably to approximately 100° C.–120° C. The raw material and recycle mixture (reactants) are then transferred in a flow 112 by a pump 114 and then a flow 116 through a heat exchanger 118. A steam or hot oil flow 120 gives up its heat to a flow 122 that enters a vessel reactor 124. The reactants are pumped continuously with pump 114. The heat exchanger 118 raises the temperature of flow 122 to 150° C.–220° C. The heat exchanger 118 may be of any type which can handle the reactant mixture, which may contain solid particles, but generally a plate-type heat exchanger is preferred. A reactor 126 is designed to hold the hot input flow at-temperature for a predetermined "residence time", e.g., several seconds to several minutes, determined by feed rate and reactor volume. Reactor 126 may be a single open-chamber vessel, a baffled vessel designed to prevent back mixing, or a series of vessels designed to produce an environment approaching plug flow. A small amount of steam flow 127 may be injected to maintain the target temperatures within reactor 126. The pressure in reactor 126 will typically be approximately 50–250 psig, as determined by the vapor pressure of the reacting mixture. From the reactor 126 a slurry flow 128 is transferred through a level control valve 129 into a pressure letdown system. The residence time in reactor 126 is indirectly controlled by the level control valve 129.

The pressure letdown system may be either a single or multiple-stage system. FIG. 3 illustrates a two-stage system that includes a first flash vessel 130 with a pressure regulating valve 132 and a level control valve 134. A second flash vessel 136 with a pressure regulating valve 138 and a level control valve 140. The vapors produced by pressure letdown from pressure regulating valves 132 and 138 are condensed and become part of the recycle flow 108. A reaction mixture 142 flows to a product separation and wash unit 144 that separates the solid pigment product from a solution of unreacted components, e.g., by filtering. A filtrate is recycled in recycle flow 108 to feed preparation unit 110 to become part of a next production cycle. A small purge flow 145 is used to control a buildup of impurities that could otherwise occur. A product pigment can be washed either as a part of the filtration operation, or in a separate step. In general, the particular washing method chosen is not important, except whatever method is chosen preferably must use a minimum of clean water. Any spent wash water is recycled and joins the filtrate as part of recycle flow 108. A washed product is made into a slurry by adding water and it leaves the separation and wash unit 144 in three washed filter cake flows 146, 148, and 150. Such flows typically have a wide particle size distribution that may embrace several product specification ranges of individual commercial-product materials. A first product output 152 is produced by adding a first classified output 154 with particle size distribution over one micron from a classifier 156. A second classified output 158 with particle size distribution under one micron is mixed with a delaminated flow 160 from a delaminator 162 to produce a second product output 164.

In a vessel-reactor type continuous-mode process 200, as shown in FIG. 4, a set of three raw materials flows 202, 204, and 206, and a process recycle flow 208 are fed into a feed preparation unit 210. Such material inputs are mixed and raised in temperature to a range of approximately 50° C.–130° C., and preferably to approximately 100° C.–120° C. The raw material and recycle mixture (reactants) are then transferred in a flow 212 by a pump 214 and then a flow 216 through a heat exchanger 218. A steam or hot oil flow 220 gives up its heat to a flow 222 that enters a pipe reactor 224. The reactants are pumped continuously with pump 214. The heat exchanger 218 raises the temperature of flow 222 to approximately 150° C.–220° C. The heat exchanger 218 may be of any type which can handle the reactant mixture, which may contain solid particles, but generally a plate-type heat exchanger is preferred. A pipe 226 is used to hold the hot input flow at-temperature for relatively short "residence times", e.g., closer to several seconds rather than several minutes. A small amount of steam flow 227 may be injected to maintain the target temperatures within pipe 226. The pressure in pipe 226 will typically be in the range of approximately 50–250 psig, as determined by the vapor pressure of the reacting mixture. From the pipe 226 a slurry flow 228 is transferred through a back pressure control valve 229 into a pressure letdown system. The residence time in pipe 226 is indirectly controlled by the feed rate from pump 214 and the volume of the system between heat exchanger 218 and the pressure valve 229.

The pressure letdown system may be either a single or multiple-stage system. FIG. 4 illustrates a two-stage system that includes a first flash vessel 230 with a pressure regulating valve 232 and a level control valve 234. A second flash vessel 236 with a pressure regulating valve 238 and a level control valve 240. The vapors produced by pressure letdown from pressure regulating valves 232 and 238 are condensed and become part of the recycle flow 208. A reaction mixture 242 flows to a product separation and wash unit 244 that separates the solid pigment product from a solution of unreacted components, e.g., by filtering. A filtrate is recycled in recycle flow 208 to feed preparation unit 210 to become part of a next production cycle. A small purge flow 245 is used to control a buildup of impurities that could otherwise occur. A product pigment can be washed either as a part of the filtration operation, or in a separate step. In general, the particular washing method chosen is not important, except whatever method is chosen preferably must use a minimum of clean water. Any spent wash water is recycled and joins the filtrate as part of recycle flow 208. A washed product is made into a slurry by adding water and it leaves the separation and wash unit 244 in three washed filter cake flows, 246, 248, and 250. Such flows typically have a wide particle size distribution that may embrace several product specification ranges of individual commercial-product materials. A first product output 252 is produced by adding a first classified output 254 with particle size distribution over one micron from a classifier 256. A second classified output 258 with particle size distribution under one micron is mixed with a delaminated flow 260 from a delaminator 262 to produce a second product output 264.

Alternatively, the pressure in the last flash vessel may be controlled below atmospheric pressure without pressure regulation valve 232 by cooling vapors below their normal boiling points and controlling the pressure downstream of the condenser.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A process for making white pigment directly from constituent materials without byproducts, the process comprising the steps of:

inputting three material flows comprising a sulphate source, an alkali source, and an aluminum source;

recycling and mixing into said three material flows a process return from a separation and wash stage and vapors from a pressure let-down stage;

heating and holding a mixture of recycled process returns and said three material flows at elevated pressure in a reactor for a minimum predetermined residence time;

letting down pressure in a flow from said reactor after said minimum predetermined residence time to produce a pre-wash flow; and separating, classifying, and delaminating said pre-wash flow into a first and second pigment or filler that are differentiated by their respective average particle distribution sizes and providing for said first and second pigments or fillers that principally include a double salt of the type $wK_2SO_4 \cdot xAl_2O_3 \cdot zH_2O$ or $vNa_2SO_4 \cdot xAl_2O_3 \cdot ySO_3 \cdot zH_2O$, where, "v" is the stoichiometric coefficient of $Na_2SO_4$, between about zero and one; "w" is the stoichiometric coefficient of $K_2SO_4$, between about zero and one "x" is the stoichiometric coefficient of $Al_2O_3$, about there "y" is the stoichiometric coefficient of $SO_3$ about four; and "z" is the stoichiometric coefficient of $H_2O$, about nine, and wherein using both alkali metals, K and Na, as the raw materials produces a combination double salt.

2. A process for making a pigment substitute for titanium dioxide of either basic potassium aluminum sulfate $K_2SO_4 3Al_2O_3 4SO_3+xH_2O$ or basic sodium aluminum sulfate $Na_2SO_4\ 3Al_2O_3 4SO_3+xH_2O$, wherein "x" is nominally nine, the process comprising the steps of:

inputting a first material feed of $H_2SO_4$ or aluminum sulfate having a first material purity level;

input ting a second material feed including one of a sulfate salt and a hydroxide, at least one of potassium and sodium, and having a second material purity level;

inputting a third material feed including one of a sulfate salt of aluminum and a hydroxide of aluminum, and having a third material purity level;

mixing said first through third material feeds in a reactor;

returning a wash water including at least one of a basic potassium aluminum sulfate or a basic sodium aluminum sulfate, $H_2O$, and $H_2SO_4$ to said reactor;

holding said first through third material feeds in said reactor for a residence time; and drawing off a flow of refined double salt crystals from said reactor that include $Al_2(SO_4)$, and one of $K_2SO_4\ yH_2O$ and $Na_2SO_4 \cdot yH_2O$; and wherein "y" is an integer.

3. The process of claim 2, further comprising the step of:

filtering and washing said output flow of said pigment reactor; and delaminating to produce an output of one of basic potassium aluminum sulfate and basic sodium aluminum sulfate.

4. The process of claim 3, further comprising the step of:

centrifuging said output from the step of delaminating in a bowl-type centrifuge with at least two bowl-centrifuge liquid taps at different radial points to bifurcate a pigment substitute material output into one product with particle sizes under a micron in diameter and at least one other product with particle sizes having diameters of one to four microns.

5. A process for making white pigment directly from constituent materials without byproducts, the process comprising the steps of:

inputting three material flows comprising a sulphate source, an alkali source, and an aluminum source;

recycling and mixing into said three material flows a process return from a separation and wash stage and vapors from a pressure let-down stage;

heating and holding a mixture of recycled process returns and said three material flows at elevated pressure in a reactor for a minimum predetermined residence time providing a hydrolysis of components at a temperature of approximately 150° C.–220° C. in a batch process;

letting down pressure in a flow from said reactor after said minimum predetermined residence time to produce a pre-wash flow; and separating, classifying, and delaminating said pre-wash flow into a first and second pigment or filler that are differentiated by their respective average particle distribution size.

6. A process for making white pigment directly from constituent materials without byproducts, the process comprising the steps of:

inputting three material flows comprising a sulphate source, an alkali source, and an aluminum source;

recycling and mixing into said three material flows a process return from a separation and wash stage and vapors from a pressure let-down stage;

heating and holding a mixture of recycled process returns and said three material flows at elevated pressure in a reactor for a minimum predetermined residence time providing a hydrolysis of components Al/Na and/or K and $So_4$=at a temperature of approximately 150° C.–220° C. in a continuous process;

letting down pressure in a flow from said reactor after said minimum predetermined residence time to produce a pre-wash flow; and separating, classifying, and delaminating said pre-wash flow into a first and second pigment or filler that are differentiated by their respective average particle distribution size.

7. A process for making white pigment directly from constituent materials without byproducts, the process comprising the steps of:

inputting three material flows comprising a sulphate source, an alkali source, and an aluminum source;

recycling and mixing into said three material flows a process return from a separation and wash stage and vapors from a pressure let-down stage;

heating and holding a mixture of recycled process returns and said three mateat flows at elevated pressure in a reactor for a minimum predetermined residence time;

letting down pressure in a flow from said reactor after said minimum predetermined residence time to produce a pre-wash flow;

separating, classifying, and delaminating said pre-wash flow into a first and second pigment or filler that are differentiated by their respective average particle distribution size; and removing impurity sediments formed by hydrolysis at about 130° C. before a hydrolysis of a next-stage product at a temperature in a range of approximately 150° C.–220° C.

\* \* \* \* \*